United States Patent
Simper et al.

(10) Patent No.: US 9,093,866 B2
(45) Date of Patent: Jul. 28, 2015

(54) CONFIGURABLE POWER SWITCHING CONTROLLER

(75) Inventors: Norbert J. Simper, Bissingen (DE); Andrew David Bellis, Rockford, IL (US); Markus Greither, Augsburg (DE)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 547 days.

(21) Appl. No.: 13/491,863

(22) Filed: Jun. 8, 2012

(65) Prior Publication Data

US 2013/0140891 A1 Jun. 6, 2013

Related U.S. Application Data

(60) Provisional application No. 61/566,283, filed on Dec. 2, 2011.

(51) Int. Cl.
*H02J 3/46* (2006.01)
*H02J 3/00* (2006.01)
*H01H 9/54* (2006.01)

(52) U.S. Cl.
CPC .. *H02J 3/46* (2013.01); *H02J 3/005* (2013.01)

(58) Field of Classification Search
USPC .......................................................... 307/140
See application file for complete search history.

(56) References Cited

U.S. PATENT DOCUMENTS

| | | | |
|---|---|---|---|
| 5,797,757 A | * | 8/1998 | Aoki .............................. 439/101 |
| 6,470,224 B1 | | 10/2002 | Drake et al. |
| 6,768,350 B1 | | 7/2004 | Dickey |
| 6,856,045 B1 | | 2/2005 | Beneditz et al. |
| 7,064,448 B2 | | 6/2006 | Maier |
| 7,505,820 B2 | | 3/2009 | Plivcic et al. |
| 7,747,879 B2 | | 6/2010 | Tofigh et al. |
| 8,031,451 B2 | | 10/2011 | Beneditz et al. |
| 8,089,303 B2 | | 1/2012 | Girot et al. |
| 8,148,848 B2 | | 4/2012 | Rusan et al. |
| 2002/0162033 A1 | * | 10/2002 | Maxwell et al. .............. 713/300 |
| 2013/0119766 A1 | * | 5/2013 | Hsieh et al. ..................... 307/64 |

* cited by examiner

*Primary Examiner* — Robert Deberadinis
(74) *Attorney, Agent, or Firm* — Carlson, Gaskey & Olds, P.C.

(57) ABSTRACT

A configurable power switching controller includes multiple power channels and a programming connector that connects the load outputs of a subset of the multiple power channels thereby creating at least one merged power channel.

17 Claims, 1 Drawing Sheet

CONFIGURABLE POWER SWITCHING CONTROLLER

REFERENCE TO RELATED APPLICATIONS

This application claims priority to U.S. Provisional Patent Application No. 61/566,283, filed Dec. 2, 2011.

BACKGROUND OF THE INVENTION

The present disclosure relates generally to power switching controllers, and more particularly to programmable solid-state power switching controllers.

Programmable power switching controllers are generally known and are characterized by having adjustable (programmable) output ratings. One type of programmable power switching controller is constructed from solid-state components and is referred to as a solid-state programmable power switching controller. Disadvantageously, however, the hardware for a programmable solid-state power switching controller must incorporate sufficient components on each power channel to handle the maximum output rating allowed for the power channel. Consequently, any systems utilizing less than the full current rating of a given channel includes the excess weight of the unnecessary switching components, as well as the associated controls required to operate the unnecessary switching components

SUMMARY OF THE INVENTION

Disclosed is a programmable power switching controller having: a plurality of power channels, each of the power channels having a load output, and a programming connecter operable to connect the load output of each power channel in a subset of power channels to the output of each other power channels in the subset, thereby creating a merged power switching controller channel.

Also disclosed is a multi-channel solid-state power distribution system having: a programmable solid-state power switching controller with a plurality of channels, and a cross communication system operable to enable each of the plurality of channels to cross communicate with each other of the plurality of channels.

These and other features of this application will be best understood from the following specification and drawings, the following of which is a brief description.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
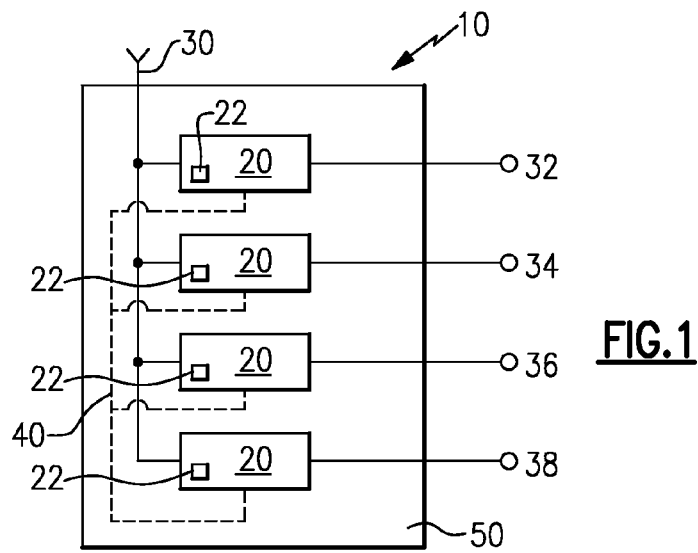
FIG. 1 illustrates a highly schematic view of a programmable solid-state power switching controller in a first configuration.

FIG. 1 illustrates a solid-state power switching controller 10. The solid-state power switching controller 10 includes four independent channels 20, each of which includes all of the components necessary to operate as a power switching controller channel. Each of the independent power channels 20 is connected to a corresponding load output 32, 34, 36, 38. A power input 30 provides input power to each of the independent power channels 20. Also included is a cross-channel communication 40 arrangement that allows each of the independent power channels 20 to communicate with each of the other independent power channels 20 as necessary.

In the illustrated example of FIG. 1, each of the independent power channels 20 is contained on a single shared substrate 50, thereby forming a single solid-state power switching controller 10 module that can control power distribution to each of the multiple loads 32, 34, 36, 38. Each of the independent power channels 20 includes a controller 22, such as a microprocessor, microcontroller, Application-Specific Integrated Circuit (ASIC) or Field Programmable Gate Array (FPGA). In an alternate example, a single controller can be located on the solid-state power switching controller 10 module and control each of the independent power channels 20 using a single controller or a pair of redundant controllers. In the alternate example, the single controller, or pair of redundant controllers, facilitates cross-channel communication 40 arrangement between the power channels 20.

The substrate 50 is constructed in a manner that allows a programming connector to be fastened to the substrate 50. This programming connector can either be fastened onto the substrate 50, or be connected externally to the solid-state power switching controller 10 module. The programming connector includes jumper connections that electrically connect two or more of the load outputs 32, 34, 36, 38 together to form a single merged output. The programming connector can also include a communications connection that connects to the controllers 22 and informs the controllers 22 of the merged outputs, thereby allowing the controllers 22 to provide appropriate power switching controls. In the alternate example, the single controller, or pair of redundant controllers, would similarly be informed from the programming connector of the configuration of merged outputs.

The load outputs 32, 34, 36, 38 illustrated in FIG. 1 are the default load outputs 32, 34, 36, 38 when no programming connector is connected to the power switching controller 10. Each of the independent power channels 20 has a specific maximum current rating at which the independent power channel 20 can operate. In one example configuration, the current rating of each independent power channel 20 is identical to the current rating of each other independent power channel 20. In such a configuration, the current rating of each independent power channel 20 is the minimum programmable current rating for the programmable solid-state power switching controller 10. In other example configurations, the current rating of each independent power channel 20 can vary from channel to channel. In one example solid-state power switching controller, the current rating of each independent power channel 20 is 3 amps. In another example solid-state power switching controller the current rating of each individual power channel is 2.5 amps.

A cross-channel communication 40 arrangement connects each controller 22 to each other controller 22, and allows the controllers 22 to share individual channel data, such as for synchronizing switching or summing the current between any merged independent power channels 20. In the illustrated example of FIG. 1, the cross-channel communication 40 arrangement is shown using a dashed line indicating that there are no merged independent power channels 20.

Figure 2:
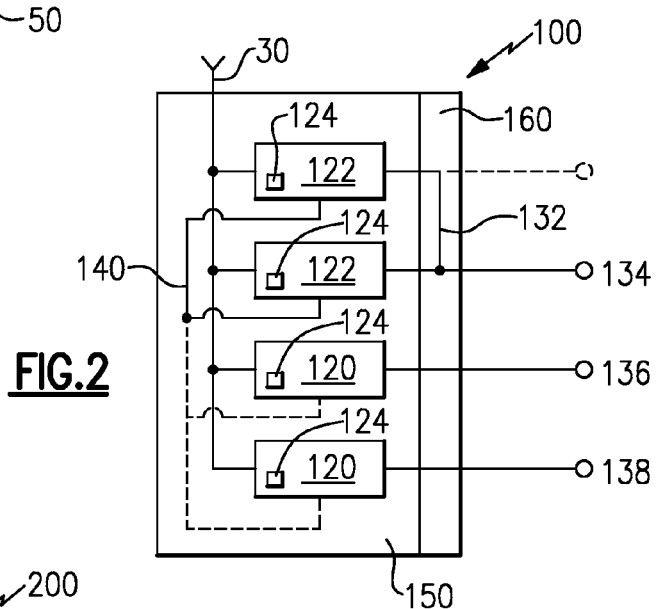
FIG. 2 shows a highly schematic view of a programmable solid-state power switching controller in a second configuration.

Turning now to FIG. 2, with continued reference to FIG. 1, FIG. 2 illustrates the example solid-state power switching controller 10 of FIG. 1 with an attached programming connector 160. The programming connector 160 alters the load output 132 by electrically connecting the load output 132 to another load output 134 to form a single merged power channel 122 consisting of the independent power channels 20 corresponding to load outputs 132 and 134. The merged power channel 122 arrangement is communicated to the corresponding controllers 124 in the merged power channels 122 which cross-communicate using a cross-communication arrangement 140. In this way, the underlying independent power channels 20 operate in conjunction to act as a single merged solid-state power channel 122 and, with communications, to enable coordinated operation of the merged channel 122 using cross-communication arrangement 140. In the alternate example, using a single controller, or pair of redundant controllers, the single controller or pair of redundant controllers can facilitate the cross-channel communication of which channels are merged, and which are independent. Also, the single controller, or pair of redundant controllers, can implement communications to and from the merged channel 122 and independent power channels 120 to coordinate and control all power channels on the power switching controller 100.

The current rating of the merged power channel 122 is approximately equal to the sum of the current rating of each of the underlying independent power channels 120 that combine to make up the merged power channel 122. The exact current rating of the merged power channel 122 can be nominally affected by connections within the programming connector 160, other internal connections, or internal switching and thermal losses, and may not be exactly the sum of the current ratings of the underlying independent power channels 122.

In the arrangement of FIG. 2, each of the independent power channels 120 corresponding to the load outputs 136, 138 are available to be utilized as independent power channels 120. Thus, the illustrated arrangement of FIG. 2 allows for three power channels 120, 122 to be utilized with the merged power channel 122 having approximately twice the current rating of the two independent power channels 120.

In an example configuration utilizing a synchronization controller to control the cross-channel communication 140 between the solid-state power channels 120, 122 the programming connector 160 is linked to the synchronization controller and informs the synchronization controller of the merged power channel 122 and of the specific power channels 120 comprising the merged power channel 122, thereby allowing for proper switching synchronization.

Figure 3:
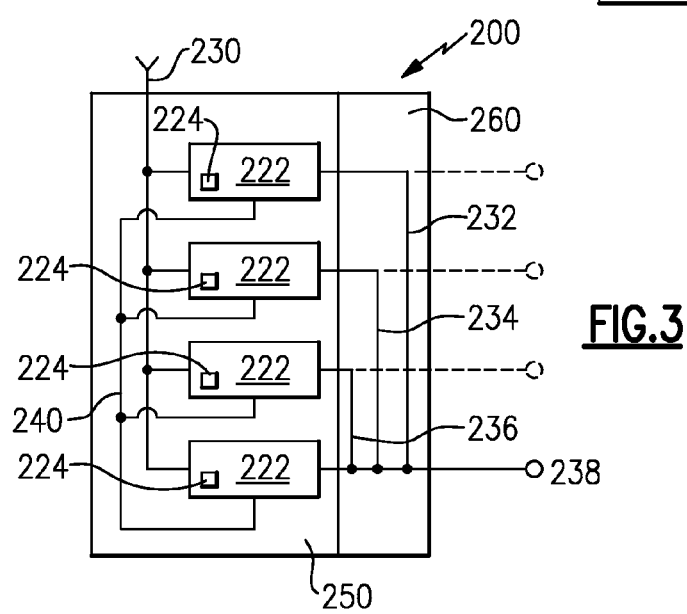
FIG. 3 illustrates a highly schematic view of a programmable solid-state power switching controller in a third configuration.

With continued reference to FIGS. 1 and 2, FIG. 3 illustrates a solid-state power switching controller 200 arranged as a single merged power channel 222 providing power to a load output 238. The single merged power channel 222 of FIG. 3 uses a programmable connector 260 to electrically connect the load outputs 232, 234, 236, 238 of the underlying independent power channels 20 together. As illustrated by the solid cross-channel communication line 240, all of the underlying power channels 20 cross-communicate and operate as a single merged power channel 222. The merged power channel 222 has a current rating approximately equal to the sum of the current ratings of each of the underlying power channels 20. In the illustrated example of FIG. 3, no synchronization controller is utilized and cross-communication is facilitated using the controllers 224 contained on each of the underlying power channels 20. In an alternate example configuration utilizing a synchronization controller, the synchronization controller facilitates the cross-channel communication arrangement 240.

As can be appreciated from each of the above examples, the power switching controller 10, 100, 200 can have power channels 20, 120 with a set current rating, and the current rating of a given power channel 20, 120 can be varied using a programming connector 160, 260 to create one or more merged power channels 122, 222 with a higher current rating, up to a maximum of a single merged power channel 222 with a current rating approximately equal to the sum of the current ratings of each of the underlying independent power channels 20, 120. It can further be appreciated that any of the independent power channels 20, 120, that are not included in the merged power channel 122, 222 can be utilized as independent power channels or included in a second merged power channel. Thus, the solid-state power switching controller 10, 100, 200 can provide multiple power channels with variable current ratings without requiring each channel to include components sufficient to handle the maximum current rating. It can be further appreciated, in light of this disclosure, that additional independent power channels 20, 120 beyond the illustrated four can be utilized on a single power switching controller 10, 100, 200.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A programmable power switching controller comprising:
   a plurality of power channels, each of said power channels including at least a controller, a switching element and a load output; and
   a programming connecter operable to connect the load output of each power channel in a subset of power channels to the output of each other power channels in said subset, thereby creating a merged power switching controller channel.

2. The programmable power switching controller of claim 1, wherein each of said power channels has a first current rating and wherein said merged power channel has a second current rating different from the first current rating.

3. The programmable power switching controller of claim 2, wherein said second current rating is higher than said first current rating.

4. The programmable power switching controller of claim 3, wherein said second current rating is approximately equal to said first current rating multiplied by a number of power channels in said subset of power channels.

5. The programmable power switching controller of claim 1, wherein said connector is fastened to said programmable power switching controller, and comprises jumper connections operable to electrically connect a load output of each of said power channels in said merged power channel such that said merged power channel has a single load output.

6. The programmable power switching controller of claim 1, further comprising a cross communication arrangement operable to allow each of said power channels to cross communicate with each other of said power channels.

7. The programmable power switching controller of claim 1, further comprising a synchronization controller operable to synchronize each of said power channels in said merged power channel.

8. The programmable power switching controller of claim 1, wherein said programming connector is further operable to connect the output of each power channel in a second subset of power channels to the output of each other power channel in said second subset of power channels, thereby creating a second merged power channel.

9. A multi-channel solid-state power distribution system comprising:
a programmable solid-state power switching controller having a plurality of channels, each of said power channels including at least a controller, a switching element and a load output;
a cross communication system operable to enable each of said plurality of channels to cross communicate with each other of said plurality of channels.

10. The multi-channel solid-state power distribution system of claim 9, wherein said programmable solid-state power switching controller comprises:
a plurality of power channels, each of said power channels having a load output;
a programming connecter operable to connect the load output of each power channel in a subset of power channels to the output of each other power channels in said subset, thereby creating a merged power switching controller channel.

11. The programmable power switching controller of claim 10, wherein each of said power channels has a first current rating and wherein said merged power channel has a second current rating different from the first current rating.

12. The programmable power switching controller of claim 11, wherein said second current rating is higher than said first current rating.

13. The programmable power switching controller of claim 12, wherein said second current rating is approximately equal to said first current rating multiplied by a number of power channels in said subset of power channels.

14. The programmable power switching controller of claim 10, wherein said connector is fastened to said programmable power switching controller, and comprises jumper connections operable to electrically connect a load output of each of said power channels in said merged power channel such that said merged power channel has a single load output.

15. The programmable power switching controller of claim 10, further comprising a cross communication arrangement operable to allow each of said power channels to cross communicate with each other of said power channels.

16. The programmable power switching controller of claim 10, further comprising a synchronization controller operable to synchronize each of said power channels in said merged power channel.

17. The programmable power switching controller of claim 10, wherein said programming connector is further operable to connect the output of each power channel in a second subset of power channels to the output of each other power channel in said second subset of power channels, thereby creating a second merged power channel.

* * * * *